United States Patent
Hui et al.

(10) Patent No.: US 9,553,796 B2
(45) Date of Patent: Jan. 24, 2017

(54) CYCLE-FREE MULTI-TOPOLOGY ROUTING

(71) Applicant: Cisco Technology, Inc., San Jose, CA (US)

(72) Inventors: Jonathan W. Hui, Belmont, CA (US); Jean-Philippe Vasseur, Saint Martin d'Uriage (FR); Wei Hong, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 363 days.

(21) Appl. No.: 13/837,642

(22) Filed: Mar. 15, 2013

(65) Prior Publication Data

US 2014/0269413 A1 Sep. 18, 2014

(51) Int. Cl.
| | | |
|---|---|---|
| *G01R 31/08* | (2006.01) | |
| *H04L 12/28* | (2006.01) | |
| *H04L 12/705* | (2013.01) | |
| *H04L 12/751* | (2013.01) | |
| *H04L 12/753* | (2013.01) | |

(52) U.S. Cl.
CPC .............. *H04L 45/18* (2013.01); *H04L 45/02* (2013.01); *H04L 45/48* (2013.01)

(58) Field of Classification Search
CPC .......... H04L 41/12; H04L 45/02; H04L 45/52; H04L 12/28; H04L 45/18; H04L 12/705; H04L 43/08; H04L 45/20; H04L 45/123; H04W 40/24
USPC ........................................................ 370/254
See application file for complete search history.

(56) References Cited

U.S. PATENT DOCUMENTS

| | | | |
|---|---|---|---|
| 7,047,029 B1 * | 5/2006 | Godwin et al. ................ | 455/505 |
| 7,054,277 B1 | 5/2006 | Lau et al. | |
| 7,076,594 B2 | 7/2006 | Benedetto et al. | |
| 7,333,827 B2 * | 2/2008 | Biddiscombe et al. ...... | 455/519 |
| 7,412,557 B2 | 8/2008 | Di Benedetto et al. | |
| 7,477,593 B2 | 1/2009 | Scudder et al. | |
| 7,512,064 B2 | 3/2009 | Vasseur et al. | |
| 7,633,859 B2 | 12/2009 | Filsfils et al. | |
| 7,664,013 B2 | 2/2010 | Filsfils et al. | |
| 7,684,350 B2 | 3/2010 | Raj et al. | |
| 7,693,064 B2 * | 4/2010 | Thubert ................ | H04L 43/022 |
| | | | 370/235 |
| 7,864,712 B2 | 1/2011 | Khan et al. | |
| 7,869,345 B2 | 1/2011 | Scudder et al. | |

(Continued)

OTHER PUBLICATIONS

Gnawali et al., The Minimum Rank with Hysteresis Objective Function, Request for Comments 6719, Sep. 2012, Internet Engineering Task Force Trust, 13 Pages.*

(Continued)

*Primary Examiner* — Edan Orgad
*Assistant Examiner* — Vanneilian Lalchinthang
(74) *Attorney, Agent, or Firm* — Parker Ibrahim & Berg LLC; James M. Behmke; Stephen D. LeBarron

(57) ABSTRACT

In one embodiment, a node in a shared-media communication network may determine a first directed acyclic graph (DAG) topology, wherein the first DAG topology has a particular direction. The node may determine a second DAG topology in the shared-media communication network based on the first DAG topology. The second DAG topology may share the particular direction of the first DAG topology, to prevent loops between the first and the second DAG topologies.

16 Claims, 9 Drawing Sheets

(56) References Cited

U.S. PATENT DOCUMENTS

| | | | |
|---|---|---|---|
| 7,911,938 B2 | 3/2011 | Florit et al. | |
| 7,961,600 B2 | 6/2011 | Filsfils et al. | |
| 8,077,633 B2 | 12/2011 | Jain et al. | |
| 8,270,313 B2* | 9/2012 | Tao et al. | 370/252 |
| 2006/0215583 A1* | 9/2006 | Castagnoli | 370/254 |
| 2006/0268908 A1* | 11/2006 | Wang et al. | 370/401 |
| 2011/0064002 A1* | 3/2011 | Khan | H04L 12/4633 |
| | | | 370/256 |
| 2011/0134793 A1 | 6/2011 | Elsen et al. | |
| 2012/0099587 A1* | 4/2012 | Fan et al. | 370/389 |
| 2012/0281539 A1 | 11/2012 | Patel et al. | |
| 2012/0300756 A1 | 11/2012 | Shah et al. | |
| 2013/0088974 A1 | 4/2013 | Bryant et al. | |

OTHER PUBLICATIONS

Gnawali et al., The minimum Rank with Hysteresis Objective Function, Request for Comments 6719, Sep. 2012, Interne Engineering Task Force Trust, 13 Pages.*

Gnawali, et al., "The Minimum Rank with Hysteresis Objective Function", Request for Comments 6719, Sep. 2012, 13 pages, Internet Engineering Task Force Trust.

Thubert, P., "Objective Function Zero for the Routing Protocol for Low-Power and Lossy Networks (RPL)", Request for Comments 6552, Mar. 2012, 14 pages, Internet Engineering Task Force Trust.

Vasseur, et al., "Routing Metrics Used for Path Calculation in Low-Power and Lossy Networks", Request for Comments 6551, Mar. 2012, 30 pages, Internet Engineering Task Force Trust.

Winter; et al., "RPL: IPv6 Routing Protocol for Low-Power and Lossy Networks", Internet Engineering Task Force, Request for Comments 6550, Mar. 2012, 157 pages.

* cited by examiner

CYCLE-FREE MULTI-TOPOLOGY ROUTING

TECHNICAL FIELD

The present disclosure relates generally to computer networks, and, more particularly, to multi-topology routing.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc., particularly given that LLNs are generally a shared-media communication network. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

Existing solutions include maintaining multiple next-hop routes to improve reliability and latency in the shared-media communication network. Specifically, in the existing solutions a single routing topology utilizing a common set of metrics (e.g., hop count or estimated transmission count, "ETX") and constraints (e.g., received signal strength indicator, "RSSI", threshold to promote link stability) may be built. However, these solutions require devices to choose or at least balance between a topology emphasizing reduced number of hops or a topology increasing route stability because metrics and constraints are often competing factors when building a routing topology.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a node in a shared-media communication network may determine a first directed acyclic graph (DAG) topology, wherein the first DAG topology has a particular direction. The node may then determine a second DAG topology in the shared-media communication network based on the first DAG topology. The second DAG topology may share the particular direction of the first DAG topology, to prevent loops between the first and the second DAG topologies.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a type of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

Figure 1:
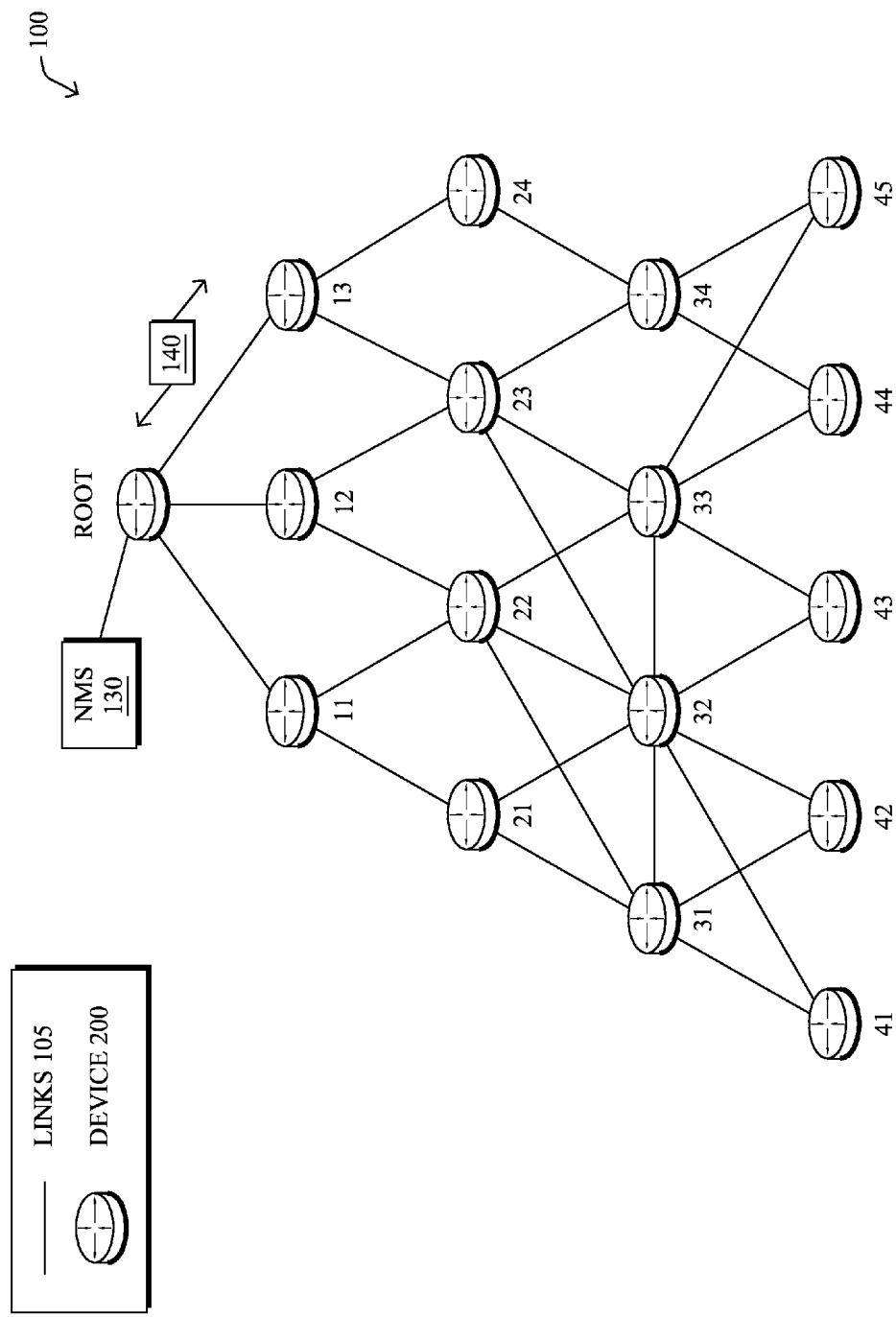
FIG. 1 illustrates an example communication network.

FIG. 1 is a schematic block diagram of an example computer network 100 illustratively comprising nodes/devices 200 (e.g., labeled as shown, "root," "11," "12," . . . "45," and described in FIG. 2 below) interconnected by various methods of communication. For instance, the links 105 may be wired links or shared-media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
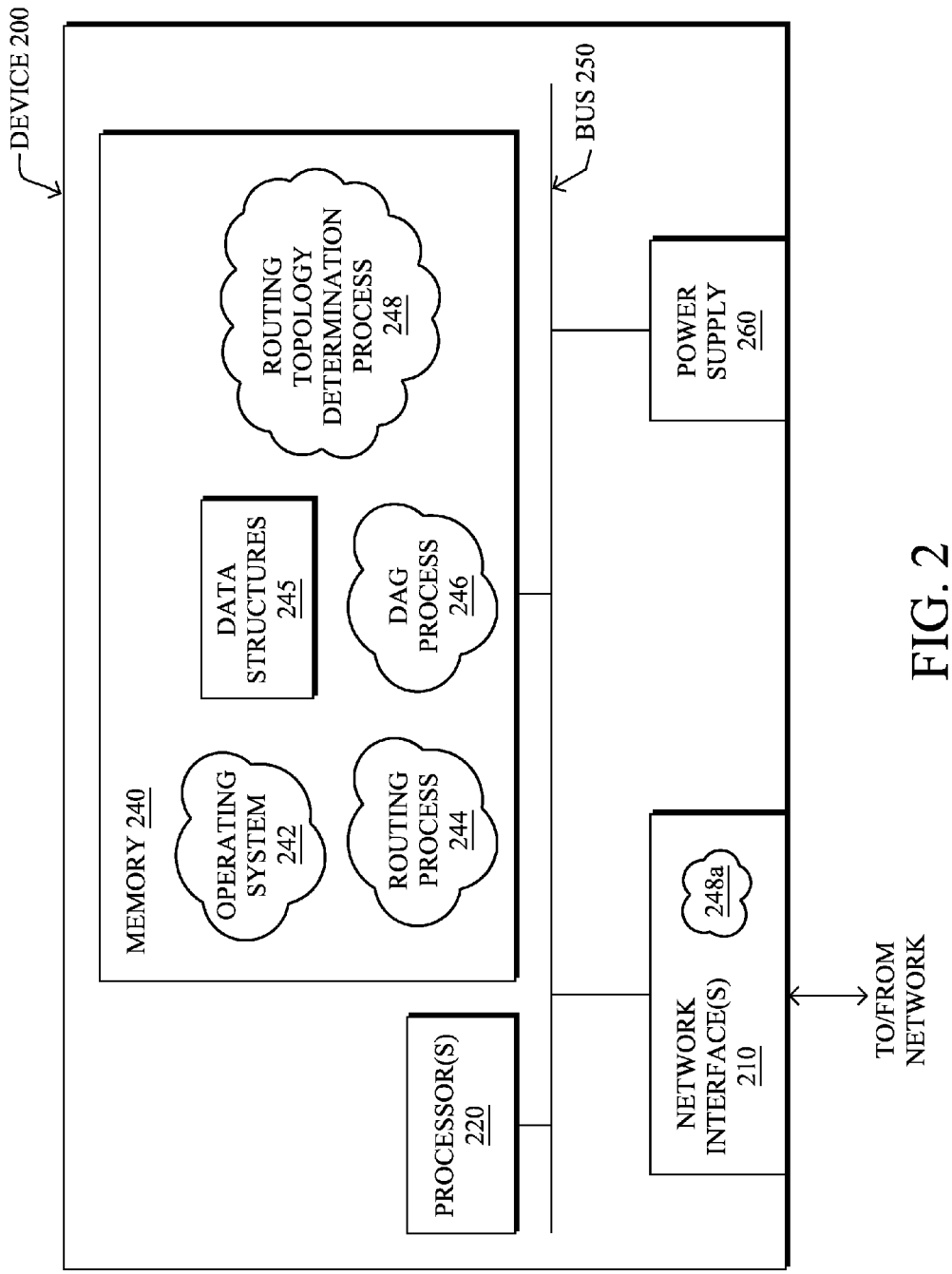
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, a directed acyclic graph (DAG) process 246, and an illustrative routing topology determination process 248, as described herein. Note that while dynamic multi-path process 248 is shown in centralized memory 240, alternative embodiments provide for the process (or portions of the process) to be specifically operated within the network interfaces 210 (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), Dynamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Furthermore, Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports Multi-Topology-Routing (MTR), whereby multiple DAGs are built to carry traffic according to individual requirements.

A DAG is a directed graph having the property that all edges (and/or vertices) are oriented in such a way that no cycles (loops) are supposed to exist. All edges are contained in paths oriented toward and terminating at one or more root nodes (e.g., "clusterheads" or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by DAG process 246) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks" <RFC 6551> by Vasseur, et al. (March 2012 version). Further, an example OF (e.g., a default OF) may be found in an IETF RFC, entitled "RPL Objective Function 0" <RFC 6552> by Thubert (March 2012 version) and "The Minimum Rank Objective Function with Hysteresis" <RFC 6719> by O. Gnawali et al. (September 2012 version).

The process of building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
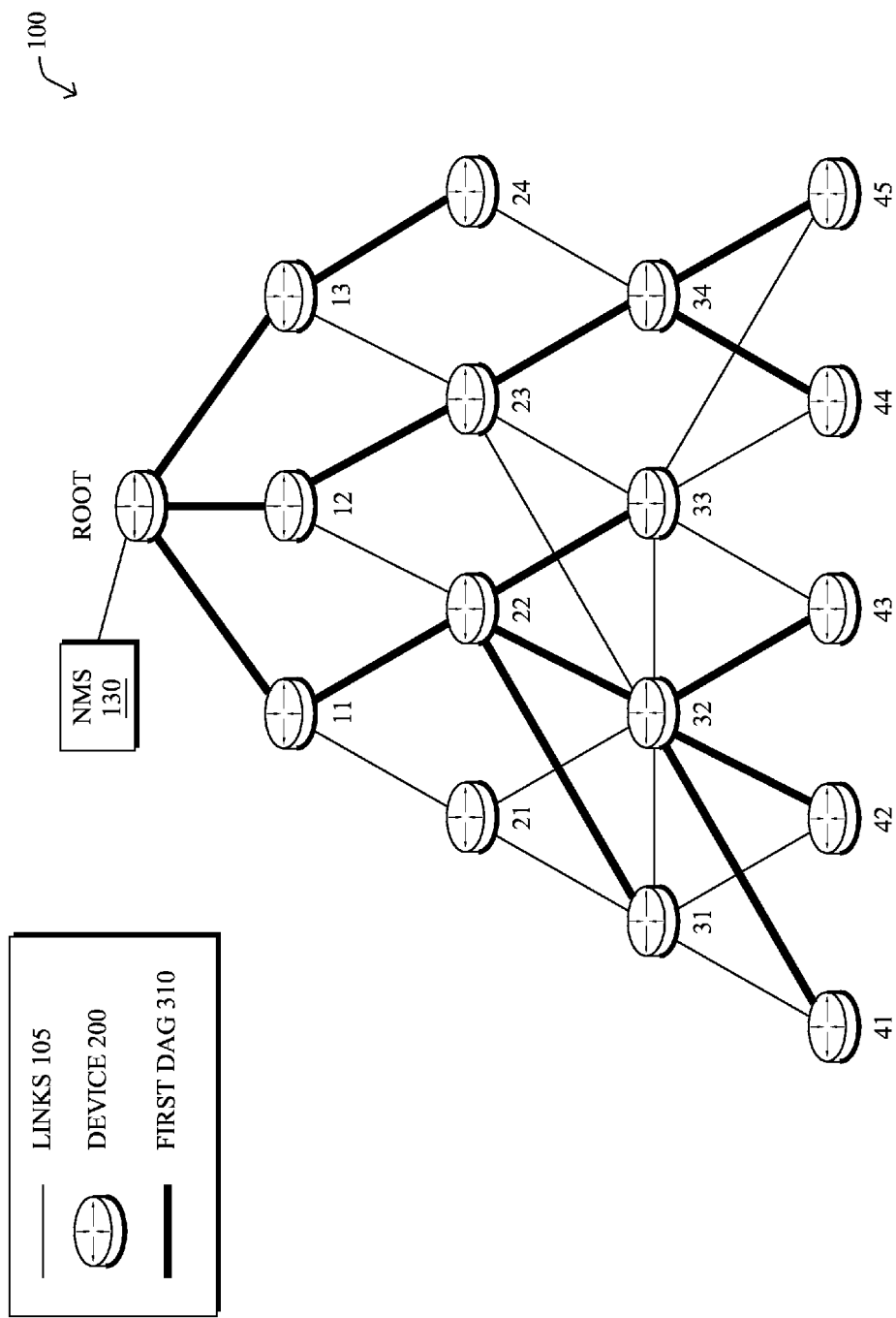
FIG. 3 illustrates an example first directed acyclic graph (DAG) topology in the communication network of FIG. 1.

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node toward one or more leaf nodes (nodes without children). Traffic/packets 140 (shown in FIG. 1) may then traverse the DAG 310 in either the upward direction toward the root or downward toward the leaf nodes, particularly as described herein.

As noted above, existing LLN solutions typically form a single routing topology (e.g., a single DAG). Thus, routing is performed over a topology using either links that reduce latency and channel utilization (e.g., "long" links) or links that increase link stability and robustness (e.g., "short" links). Furthermore, these solutions apply a minimum link margin constraint threshold in selecting next-hop routes. For example, in a connected grid mesh solution, only routes having a received signal strength indicator (RSSI) of 10 dBm greater than the transceiver's rated sensitivity are considered. In this particular solution, the 10 dBm threshold is based on observed behaviors with varying environmental conditions. In addition, the link may be utilized for forwarding until the ETX reaches a predetermined limit.

However, enforcing a hysteresis on link margin constraints limits the network from utilizing links with reduced hop count (e.g., long links) when they are available. Lowering the hysteresis threshold promotes the use of links with reduced hop count but also increases the risk of link instability. In other words, links with a low link margin constraint may become unstable.

Cycle-Free Multi-Topology Routing

One option available to create multiple routing topologies is known as multi-topology routing (MTR), where each topology is created independently. For example, a first and second topology may be built independently with different hysteresis thresholds. Based on the example above, for instance, devices in the network 100 may build one routing topology based on link stability and a second routing topology, independent of the first, based on a reduced hop count. However, once a routing topology is determined for forwarding given traffic, switching to the other topology should not be allowed for that traffic. In particular, since the topologies are created independently (i.e., may choose different paths and different directions within the network), switching between the topologies may result in routing loops (cycles).

The techniques herein, however, provide a mechanism that allows a device (e.g., a node) in a shared-media communication network to determine multiple DAG topologies in a manner that prevent loops in multi topology routing (MTR), particularly that use link stability (e.g., a stable DAG topology) and reduced hop count (e.g., a low latency DAG topology). For instance, to prevent loops in MTR, one topology (e.g., the reduced hop count DAG topology) may be built based on a previously created topology (e.g., the DAG topology emphasizing link stability), thereby, promoting the same direction of forwarding. For example, in an illustrative embodiment as described below, the network may first build a stable DAG topology by considering only next-hop routes that provide a link margin above a predetermined threshold constraint. The network may then collectively build a second DAG topology by considering next-hop routes with a relaxed link margin constraint and constraining routes to follow the particular direction of the first DAG topology. The link margin threshold for the first DAG topology (e.g., the stable DAG topology) may be an adaptive parameter applied to the entire network and controlled by a DAG root or may be a parameter locally adjusted by each device. Furthermore, since the second DAG topology in constrained to follow the particular direction of the first DAG topology, the combination of the first and the second DAG topologies does not form any routing loops. Thus, the devices may forward packets over the first or the second DAG topology, interchangeably, without a risk of encountering forwarding loops.

Illustratively, the techniques described herein may be performed by hardware, software, and/or firmware, such as in accordance with the routing topology determination process 248/248a, which may contain computer executable instructions executed by the processor 220 (or independent processor of interfaces 210) to perform functions relating to the techniques described herein, e.g., in conjunction with routing process 244 and/or DAG process 246. For example, the techniques herein may be treated as extensions to conventional protocols, such as the various routing topology creation (and utilization) protocols, and as such, may be processed by similar components understood in the art that execute those protocols, accordingly.

Operationally, the techniques herein relate to multi-topology routing (MTR) in a shared-media communication network allowing nodes to forward over a stable link topology or a reduced hop count (e.g., low latency) topology. In particular, the first topology may be built by considering only highly-stable links or considering only next-hop routes that provide a link margin above a predetermined threshold constraint. The second topology may then be built based on the first topology, wherein both topologies follow the same particular direction. Thus, the two topologies together do not form any forwarding loops or cycles. Notably, though a certain ordering of topology creation is described herein (e.g., stable links then low latency links), such an ordering is merely one example embodiment, and any desired metric and/or constraint may be used to create the first and second topologies, so long as the subsequently created topology is based on the previously created topology, as described herein.

For example, in RPL terminology, a device may construct a first DAG topology (e.g., a stable DAG topology) and may use the first DAG topology to constrain the structure of a second DAG topology (e.g., a low-latency DAG topology). Furthermore, although conventional multi-topology routing may require multiple RPL instances, these topologies are not dependent on each other. In other words, the conventional combination of multiple links across multiple RPL instances may form loops in the network. However, the techniques herein provide for a first DAG topology that is used to constrain the construction of a second DAG topology, thus preventing forwarding loops (i.e., the topologies are required to head in the same direction—e.g., toward the root). Although the techniques herein may apply to RPL, they are not limited thereto and may be applied to other multi-topology routing protocols.

In one embodiment, as shown above in FIG. 3, the network (e.g., devices 200 collectively) may build a first DAG topology 310 emphasizing link stability by considering only next-hop routes that provide a link margin above a predetermined threshold constraint. The link margin constraint may be a hysteresis threshold to ensure that the routes used to build the first DAG topology 310 may be robust for a predetermined duration. Additionally, in building the first DAG topology 310, the link margin constraint may be used to minimize the path cost. Moreover, during or after the building of the first DAG topology 310, the node may assign a DAG rank (as shown in FIG. 3 as the first digit of the node numbers, e.g., rank "1" for nodes 11, 12, and 13, rank "2" for nodes 22, 23, and 24, etc.) corresponding to a topological distance to a root node of the first DAG topology 310 (e.g., as in RPL). Notably, in one embodiment, nodes may advertise a newly defined path metric indicating the smallest link margin constraint chosen by a node along a particular path.

Figure 4:
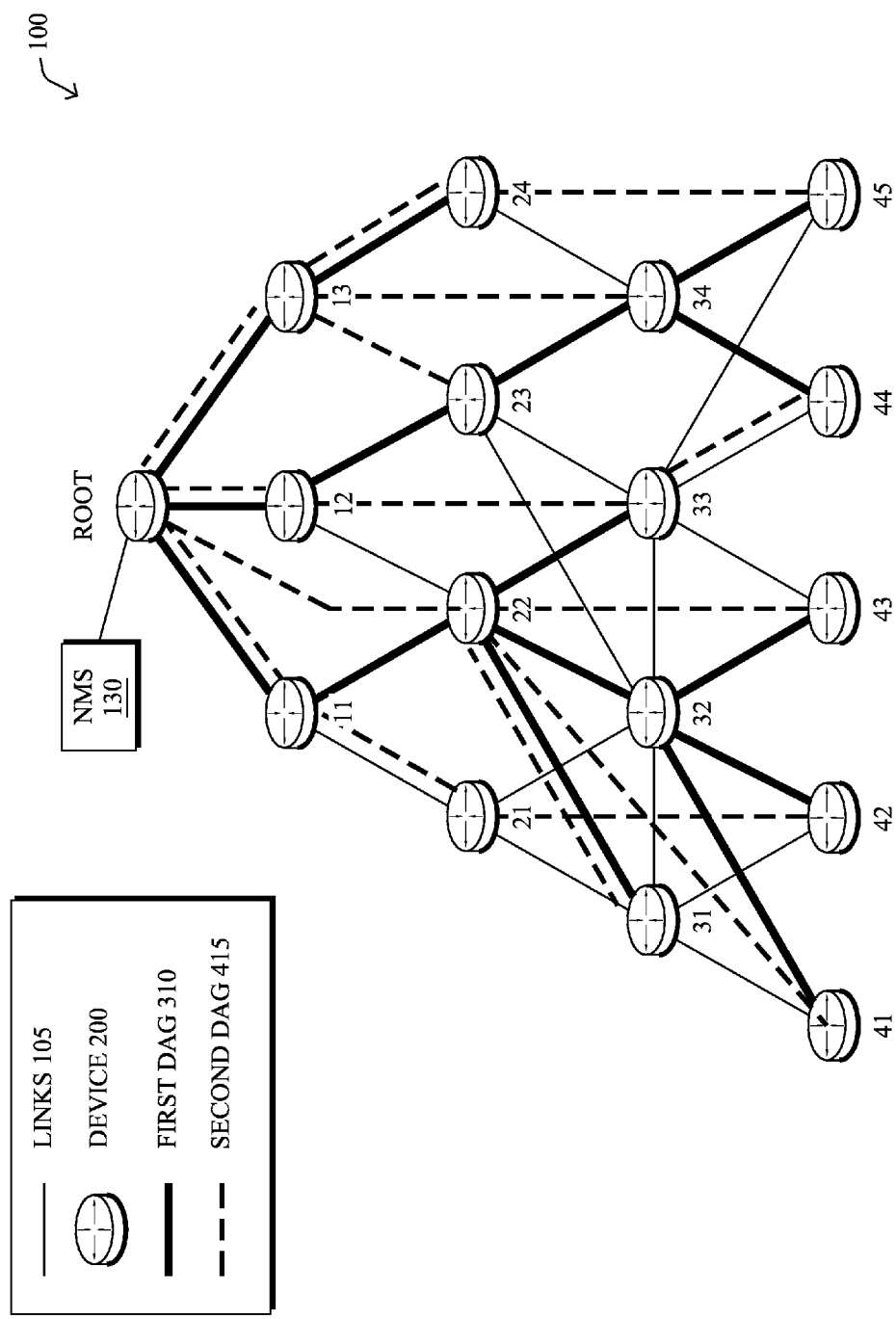
FIG. 4 illustrates an example second DAG topology based on the first routing DAG topology in the communication network of FIG. 1.

According to the techniques herein, as shown in FIG. 4, the shared-media communication network may build a second DAG topology 415 emphasizing reduced hop count (e.g., long range links) by considering next-hop routes with a relaxed link margin constraint. Specifically, however, the constraint in the second topology also requires selecting a parent in the second DAG topology 415 to have a rank in the first DAG topology 310 that is less than or equal to the rank of a first parent in the first DAG topology 310. In this manner, the second/subsequent routing topology is built while ensuring that the first and the second DAG topologies follow the same direction to prevent forwarding loops.

Note that in RPL, the second DAG topology 415 may be a second RPL instance with a different set of metrics and constraints. Alternatively, the metric may remain the same as the first DAG 310 (e.g., to minimize ETX) while the link margin constraint may be relaxed. Furthermore, as illustrated in FIG. 4, the second DAG topology 415 is not required to use (nor prevented from using) the links selected by the first DAG topology 310. That is, the second DAG topology may utilize the topology ranks determined in the first DAG topology to determine a route to the destination while ensuring no forwarding loops exist between the first and the second DAG topologies.

In another embodiment, to ensure connectivity in the network, the node may send a message to a management node indicating insufficient next-hop routes that provide a link margin above a predetermined threshold constraint. The node may then receive a response message from a management node to relax the link margin constraint. In other words, the link margin constraint may be a network wide parameter which may be advertised by a DAG root, for example, in a RPL Metric Container within a RPL DIO message. In response to the network wide parameter, RPL devices may learn of a disconnected device by receiving the DIO message. Additionally, the RPL devices may send a message to the RPL Root notifying the Root of the disconnected device using a RPL DAO message. In response to the RPL DAO message, the RPL root may relax the link margin constraint advertised in the DIO message to promote connectivity across all the RPL devices. Notably, relaxing the link margin constraint may increase connectivity and simultaneously may decrease link stability within the network. Additionally, RPL is merely an example embodiment, and the techniques herein are not limited thereto and may be applied to other distance vector routing protocols.

In yet another embodiment, to ensure connectivity in the network, the link margin constraint may be adjusted by each node. For example, when a node determines insufficient next-hop routes in a first DAG topology (e.g., a stable DAG topology), the node may locally adjust its link margin constraint. For example, a node may increase the link margin constraint in response to determining a high ETX. Alternatively, the node may tighten the link margin constraint when the node determines a sufficient number of next-hop routes satisfying the link margin constraint.

In one embodiment herein, the nodes in the shared-media communication network may adjust one or both of the determined DAG topologies based on a determined delay in the network. For example, an end-node in the network may forward a time stamped probe along the first and the second DAG topologies. In response to receiving the probe, a DAG Root (e.g., a field area router) may compare the delays in the first DAG topology to the second DAG topology. The nodes may receive a message indicating the determined delay and in response to receiving the message, may adjust the built topologies and the link margin constraint accordingly.

Figure 5A:
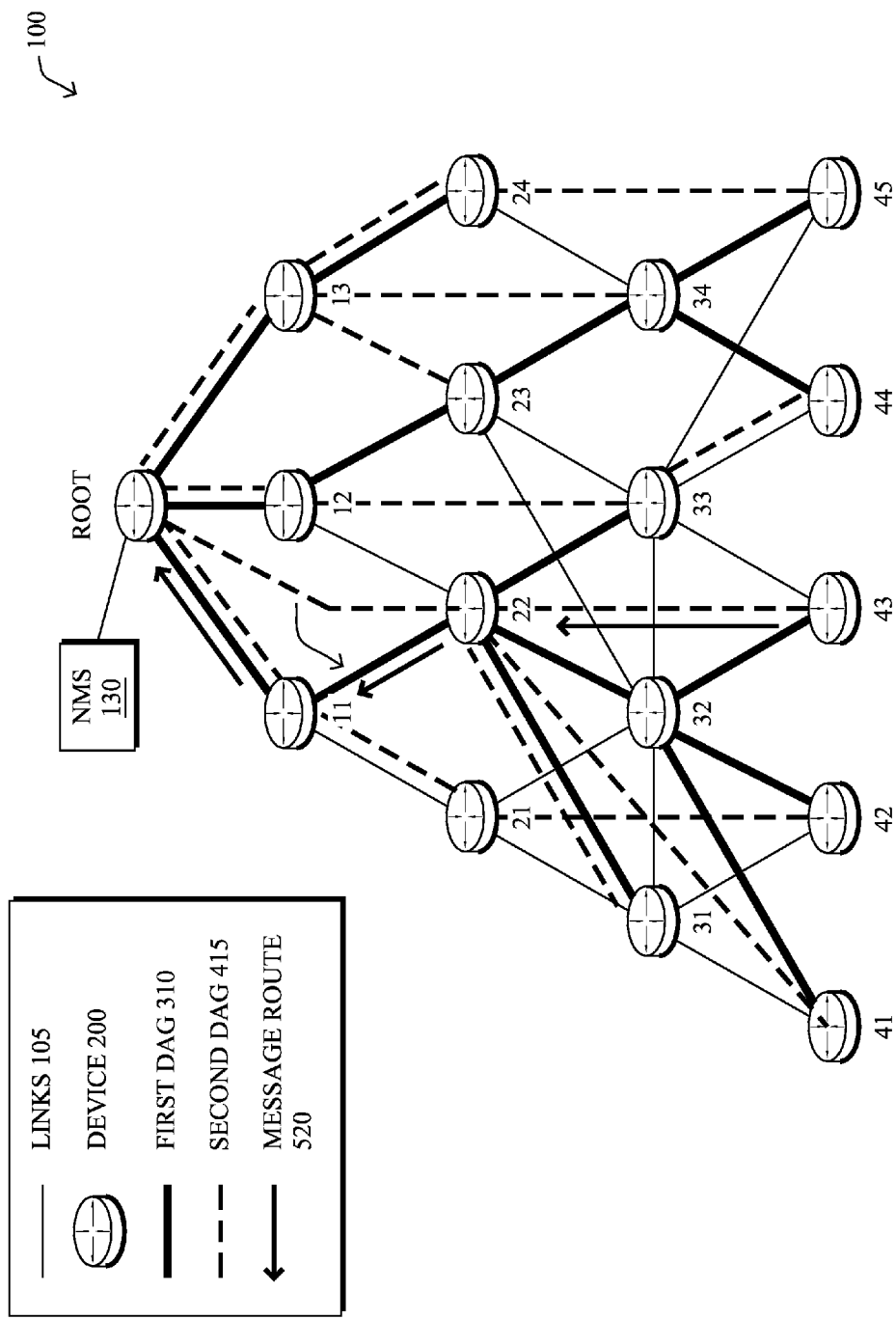
FIGS. 5A-5C illustrate example forwarding over the determined DAG topologies of FIGS. 3-4.
Figure 5B:
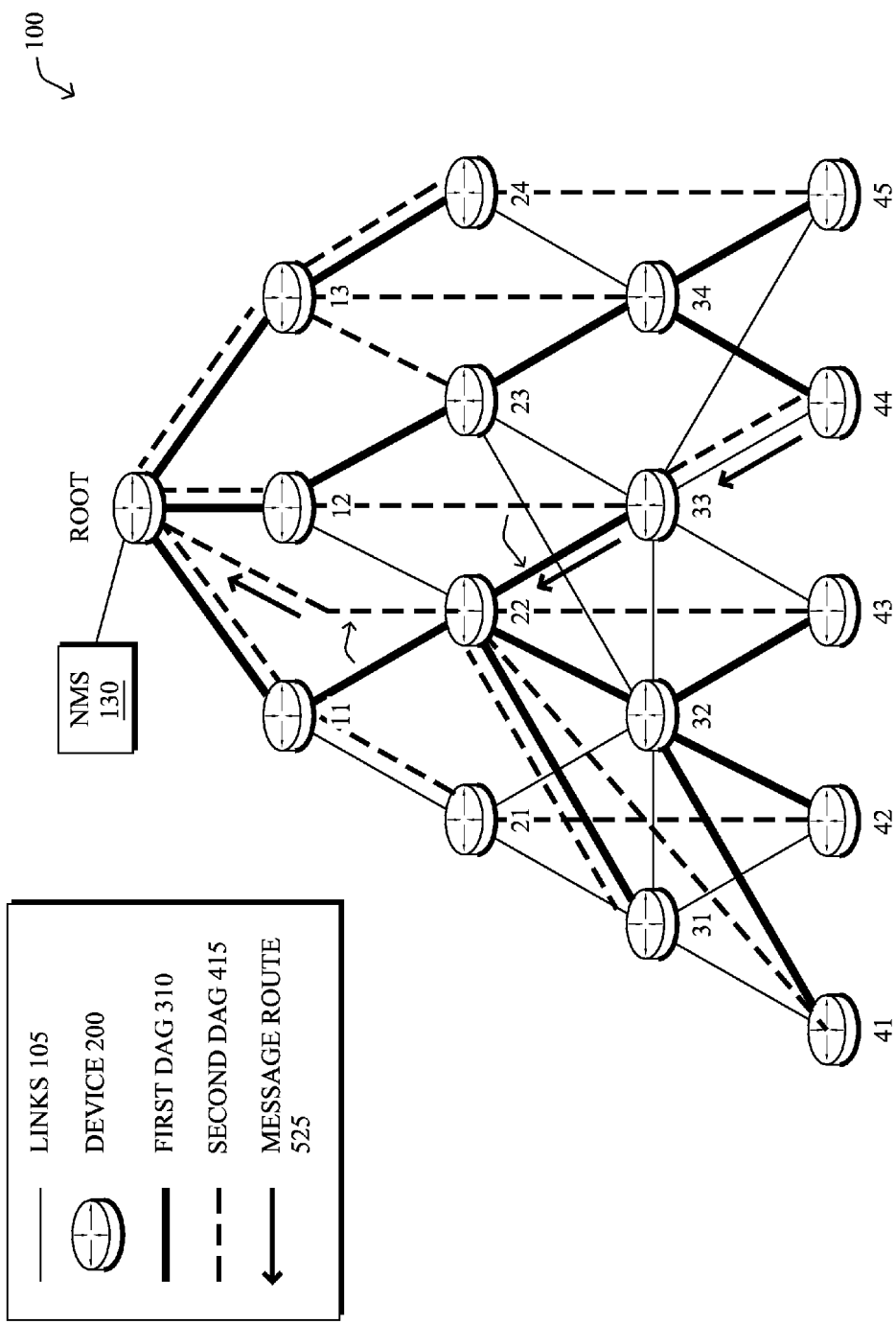
Figure 5C:
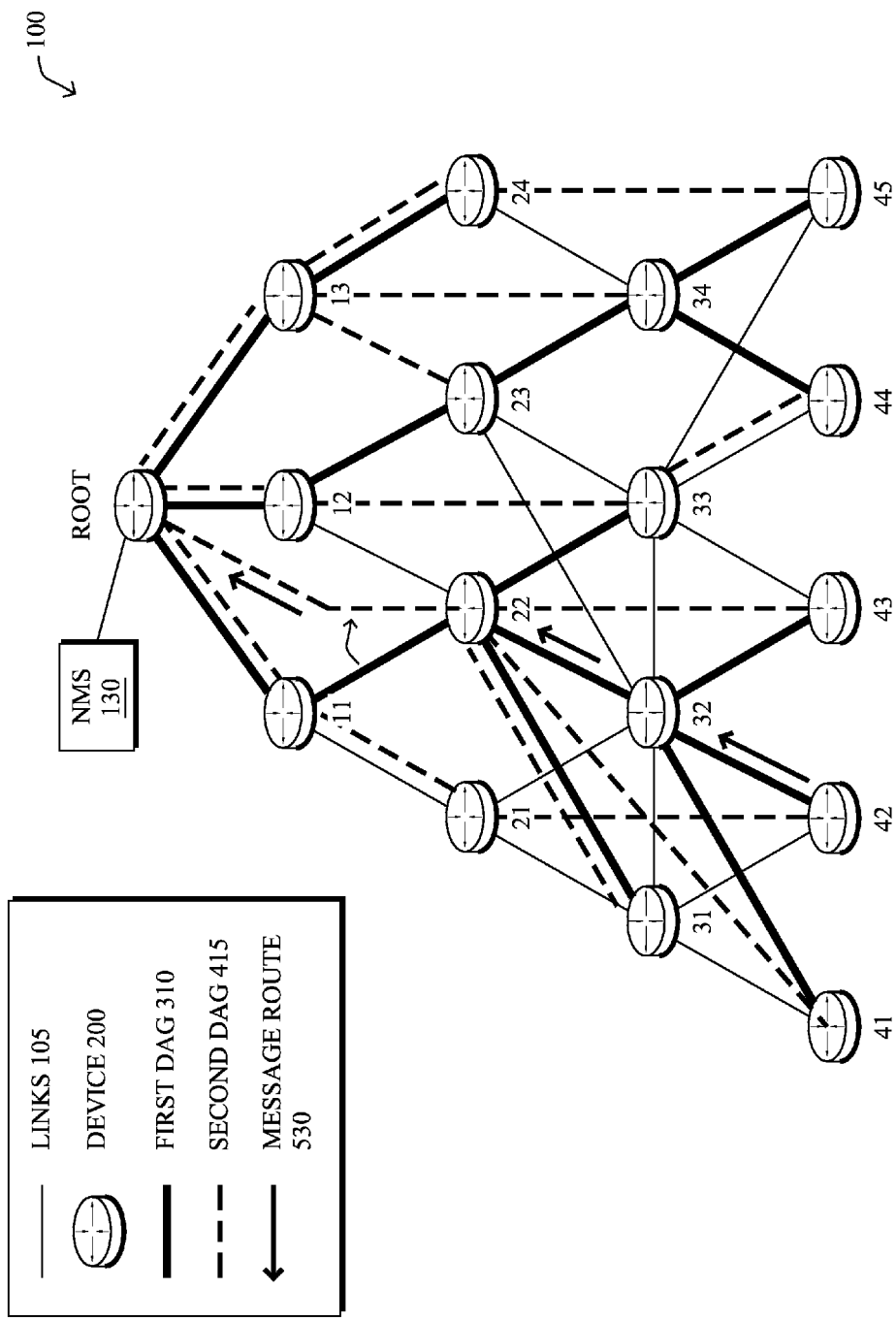

As shown in FIGS. 5A-C, after the multiple DAG topologies have been determined, a node in the shared-media communication network may forward a message (e.g., a data packet 140) using the determined DAG topologies as described herein. Specifically, nodes may forward the messages over one topology or the other based on changing network conditions. For example, in one embodiment the nodes may forward the messages over the second DAG topology 415 (e.g., the low latency DAG topology), emphasizing reduced hop count, until the link quality falls below a predetermined threshold. The link quality may be a link margin constraint, a signal strength (e.g., RSSI), ETX, or the like. In response to the link quality falling below the predetermined threshold, the node may switch topologies and begin to forward the message over the first DAG topology emphasizing link stability. In other words, the node may attempt to forward the message to the destination using fewer hops and transmissions than on a route emphasizing link stability until the links on the determined DAG topology fall below the predetermined threshold.

As shown in FIG. 5A, for instance, a source node 43 may initiate traffic (520) on the second topology 415 to node 22, but node 22 may be experiencing a low quality on the low latency link directly to the root node. As such, node 22 may switch topologies to the stable link to node 11 to continue forwarding the traffic 520 to the root over more stable links, without fear of generating any looping/cycles of the traffic.

In another example, as illustrated in FIG. 5B, the nodes may forward the messages (525) over the second DAG topology 415 until the link quality falls below a predetermined threshold. In particular, as shown in FIG. 5B, source node 44 initiates the traffic 525 on the low latency topology 415 to node 33, but then node 33 switches the forwarding to the stable topology 310 to node 22. Node 22, then, may switch back to forwarding over the second DAG topology 415 if its link quality on the second DAG topology above the predetermined threshold.

As yet another example as illustrated in FIG. 5C, the nodes may forward the message (530) over the first DAG topology 310 when initially the link quality is below the predetermined threshold along the path, but when a node is reached with a link quality above the predetermined threshold (e.g., node 22) the traffic may switch topologies and use the second DAG topology 415.

In other words, each node along the path of the traffic may make an independent decision of which topology to use, on a real-time per-packet basis, since there are no loops created between the two topologies according to the techniques herein. Notably, since alternating between topologies on a per-packet basis for multi-packet flows may result in out-of-order packet reception, various known techniques may be used to re-order the packets upon reception at the destination node (e.g., the root node). For example, assuming in FIG. 5A that node 22 sends a first packet to node 11 on the stable topology, and a second packet of the same flow/stream directly to the root node on the low latency topology, the first packet might arrive at the root from node 11 after the second packet has already arrived directly from node 22.

Notably, in another embodiment, the node may forward the message over both the first DAG topology and the second DAG topology, thereby utilizing the topology links in parallel versus sequentially and reducing delay in reaching the destination. However, when forwarding the message over both the first and second DAG topologies in parallel, the risk of packet duplication increases.

Figure 6:
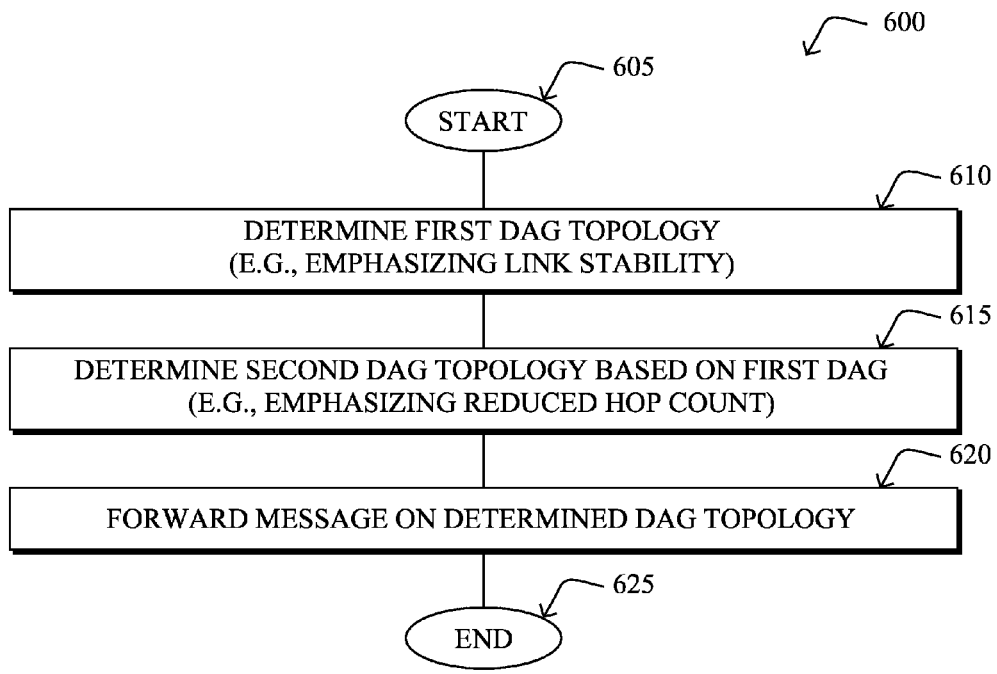
FIG. 6 illustrates an example simplified procedure for determining multiple DAG topologies and forwarding over the determined DAG topology.

FIG. 6 illustrates an example simplified procedure 600 for cycle-free multi-topology routing in a shared-media communication network in accordance with one or more embodiments described herein. The procedure 600 may start at step 605, and continues to step 610, where, as described in greater detail above, a node in the shared-media communication network may determine a first DAG topology, e.g., that emphasizes link stability. As shown in step 615, the node may determine a second DAG topology that is based on the first DAG topology, e.g., that emphasizes low latency/hop count. Based on the determined topologies, the node may forward a message in step 620, which is generally described in greater detail in FIG. 7 below. The procedure illustratively ends in step 625.

Figure 7:
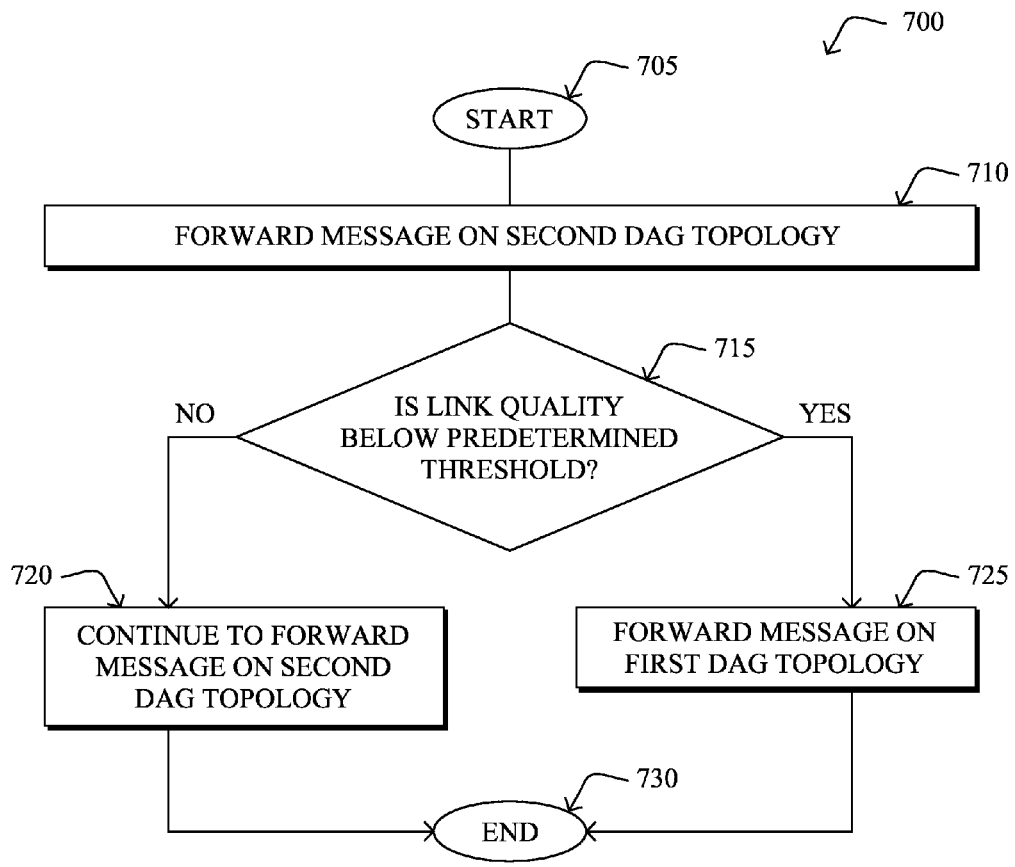
FIG. 7 illustrates an example simplified procedure of forwarding over the determined DAG topology of FIG. 6.

As noted, FIG. 7 illustrates an example simplified procedure 700 of step 620 in FIG. 6, wherein the node may forward a message over the determined DAG topology. The procedure 700 may start at step 705, and continues to step 710, where, as described above, the node may forward a message over the second (e.g., preferred) DAG topology. As shown in step 715, the node may determine whether the preference outweighs the issues of using the second DAG topology link, e.g., whether its link quality is below a predetermined threshold. Illustratively, when the link quality is not below the predetermined threshold, as shown in step 720, the node may continue to forward the message over the second DAG topology and the procedure may then illustratively end in step 730 (repeating for each packet received at the node). Alternatively, when the link quality is below the predetermined threshold (or other metric is not being satisfies), as shown in step 725, the node may switch the DAG topology and forward the message over the first DAG topology, and the procedure may then illustratively end in step 730.

It should be noted that while certain steps within procedures 600-700 may be optional as described above, the steps shown in FIGS. 6-7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-700 are described separately, certain steps from each procedure may be incorporated into each other procedure, and the procedures are not meant to be mutually exclusive.

The techniques described herein, therefore, provide for loop-free multi-topology routing in a shared-media communication network. In particular, the techniques herein allow for switching between a first DAG topology, illustratively emphasizing link stability, and a second DAG topology, illustratively emphasizing reduced hop count. Thus, once a DAG topology is determined, that particular path (selected topology) need not be maintained to reach a destination. Furthermore, the techniques herein allow a device to forward messages over a reduced hop count DAG topology (e.g., low latency DAG topology) until a link quality falls below a predetermined threshold, at which point the device may switch to the DAG topology emphasizing link stability without risk of forwarding loops.

In particular, the techniques herein provide multi-hop routing wherein either maximum transmission range is considered or link stability over time is considered depending on link quality. Increasing the transmission range decreases the number of hops, forwarding delays, and transmission to reach a final destination, thereby minimizing communication latency and channel utilization. On the other hand, when link quality decreases link margin constraints are important to consider. Increasing link margin constraints at each hop increases the overall link quality and robustness, thereby allowing a device to be more tolerable against temporal changes in interference, physical obstructions, and propagation characteristics of the physical media. Additionally, increasing the link margin constraint of each hop decreases the ETX across each individual link.

While there have been shown and described illustrative embodiments that provide for determining and utilizing multiple DAG topologies in a shared-media communication network, it is to be understood that various other adaptations and modifications may be made within the spirit and scope of the embodiments herein. For example, the embodiments have been shown and described herein with relation to LLNs and the RPL protocol. However, the embodiments in their broader sense are not as limited, and may, in fact, be used with other types of shared-media networks and/or protocols (e.g., wireless). In addition, while the techniques generally describe initiation and determinations by a node in the shared-media communication network, a network management system/server (NMS) may also be used to provide intelligence to the network functions described herein, such that the NMS determines the first and the second DAG topologies and informs the nodes in the network of the determined DAG topologies.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the accompanying claims to cover all such variations and modifications as come within the true spirit and scope of the embodiments herein.

What is claimed is:

1. A method, comprising:
    determining, by a routing topology determination process in a memory of a network device in a shared-media communication network including a plurality of network devices, a first directed acyclic graph (DAG) topology in the shared-media communication network, the first DAG topology having a particular direction;
    determining, by the routing topology determination process in a memory of the network device, a second DAG topology in the shared-media communication network based on the first DAG topology, the second DAG topology sharing the particular direction of the first DAG topology, to prevent loops between the first and the second DAG topologies,
        wherein the first DAG topology emphasizes link stability and the second DAG topology emphasizes reduced hop count and determining the first DAG topology and the second DAG topology comprises:
            building the first DAG topology by considering only next-hop routes that provide a link margin above a predetermined threshold constraint; and
            building the second DAG topology by considering next-hop routes with a relaxed link margin constraint, wherein the relaxed link margin constraint increases connectivity and simultaneously decreases link stability within the shared-media communication network.

2. The method of claim 1, further comprising:
    forwarding a message over the determined second DAG topology.

3. The method of claim 1, further comprising:
    forwarding a message over the first DAG topology in response to a link quality of the second DAG topology being below a predetermined threshold, wherein the link quality is selected from a group consisting of: a link margin constraint, a signal strength, and an estimated transmission count (ETX).

4. The method of claim 1, further comprising:
    adjusting the link margin constraint based on the number of available next-hop routes.

5. The method of claim 1, wherein building the first DAG topology is based on the link margin constraint of paths in the shared-media communication network.

6. The method of claim 1, further comprising:
    determining a rank of one or more neighboring network devices in the first DAG topology, wherein the rank of each neighboring network device represents a topological distance to a root network device of the first DAG topology.

7. The method of claim 6, further comprising:
    determining the rank of a first parent in the first DAG topology; and
    selecting a second parent in the second DAG topology to have a rank in the first DAG topology that is less than or equal to the rank of the first parent in the first DAG topology.

8. The method of claim 1, further comprising:
    sending a message to a management network device indicating insufficient next-hop routes that provide a link margin above a predetermined threshold constraint; and
    receiving a response message from the management network device to relax the link margin constraint.

9. The method of claim 1, wherein a management network device determines the first and the second DAG topologies and informs the network devices in the shared-media communication network of the determined topologies.

10. The method of claim 1, further comprising:
    adjusting one or both of the determined DAG topologies based on a determined delay in the shared-media communication network.

11. An apparatus, comprising:
    one or more network interfaces to communicate with a shared-media communication network;
    a processor coupled to the network interfaces and adapted to execute one or more processes; and
    a memory configured to store a process executable by the processor, the process when executed operable to:
        determine a first directed acyclic graph (DAG) topology in a shared-media communication network, the first DAG topology having a particular direction; and
        determine a second DAG topology in the shared-media communication network based on the first DAG topology, the second DAG topology sharing the particular direction of the first DAG topology, to prevent loops between the first and the second DAG topologies,
        wherein the first DAG topology emphasizes link stability and the second DAG topology emphasizes reduced hop count and determining the first DAG topology and the second DAG topology comprises:
            building the first DAG topology by considering only next-hop routes that provide a link margin above a predetermined threshold constraint; and
            building the second DAG topology by considering next-hop routes with a relaxed link margin constraint, wherein the relaxed link margin constraint increases connectivity and simultaneously decreases link stability within the shared-media communication network.

12. The apparatus of claim 11, wherein the process when executed is further operable to:
    forward a message over the determined second DAG topology.

13. The apparatus of claim 11, wherein the process when executed is further operable to:
    forward a message over the first DAG topology in response to a link quality of the second DAG topology being below a predetermined threshold, wherein the link quality is selected from a group consisting of: a link margin constraint, a signal strength, and an estimated transmission count (ETX).

14. The apparatus of claim 11, wherein the process when executed is further operable to:
    determine a rank of one or more neighboring nodes in the first DAG topology, wherein the rank of each neighboring node represents a topological distance to a root node of the first DAG topology.

15. The apparatus of claim 14, wherein the process when executed is further operable to:
   determine the rank of a first parent in the first DAG topology; and
   select a second parent in the second DAG topology to have a rank in the first DAG topology that is less than or equal to the rank of the first parent in the first DAG topology.

16. A tangible, non-transitory, computer-readable media having software encoded thereon, the software when executed by a processor operable to:
   determine a first directed acyclic graph (DAG) topology in a shared-media communication network, the first DAG topology having a particular direction; and
   determine a second DAG topology in the shared-media communication network based on the first DAG topology, the second DAG topology sharing the particular direction of the first DAG topology, to prevent loops between the first and the second DAG topologies,
      wherein the first DAG topology emphasizes link stability and the second DAG topology emphasizes reduced hop count and determining the first DAG topology and the second DAG topology comprises:
         building the first DAG topology by considering only next-hop routes that provide a link margin above a predetermined threshold constraint; and
         building the second DAG topology by considering next-hop routes with a relaxed link margin constraint, wherein the relaxed link margin constraint increases connectivity and simultaneously decreases link stability within the shared-media communication network.

* * * * *

UNITED STATES PATENT AND TRADEMARK OFFICE
CERTIFICATE OF CORRECTION

| | |
|---|---|
| PATENT NO. | : 9,553,796 B2 |
| APPLICATION NO. | : 13/837642 |
| DATED | : January 24, 2017 |
| INVENTOR(S) | : Jonathan W. Hui et al. |

Page 1 of 1

It is certified that error appears in the above-identified patent and that said Letters Patent is hereby corrected as shown below:

In the Specification

Column 5, Line 52, please amend as shown:
DAG is an immediate successor of the particular node on a Signed and Sealed this
Fifteenth Day of December, 2020

Andrei Iancu
*Director of the United States Patent and Trademark Office*